March 9, 1954 — A. F. BARRY — 2,671,322
SEPARATOR
Filed Oct. 16, 1950 — 2 Sheets-Sheet 1
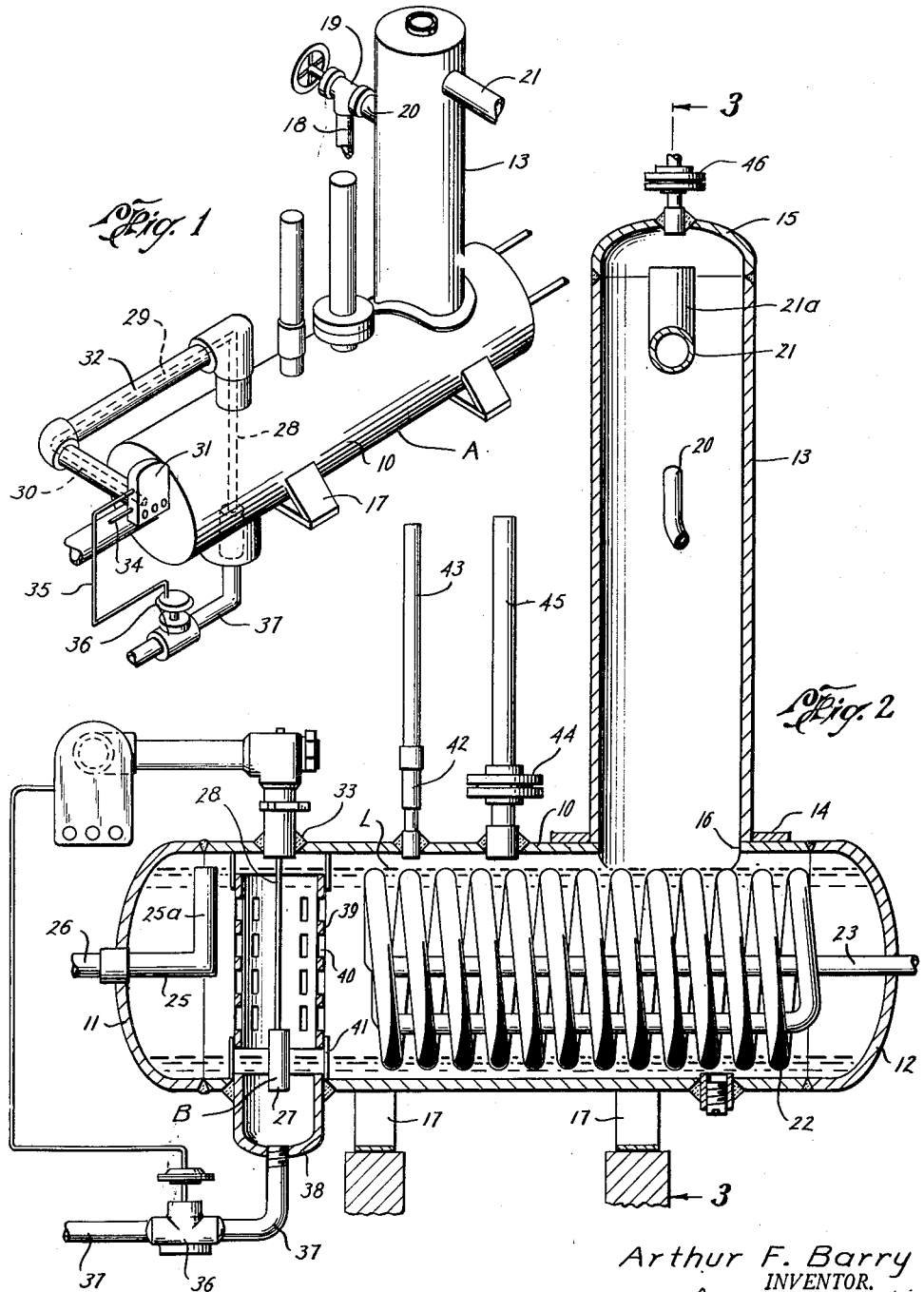
Arthur F. Barry
INVENTOR.
BY Vincent Martin
and
Joel E. Edwards
ATTORNEYS

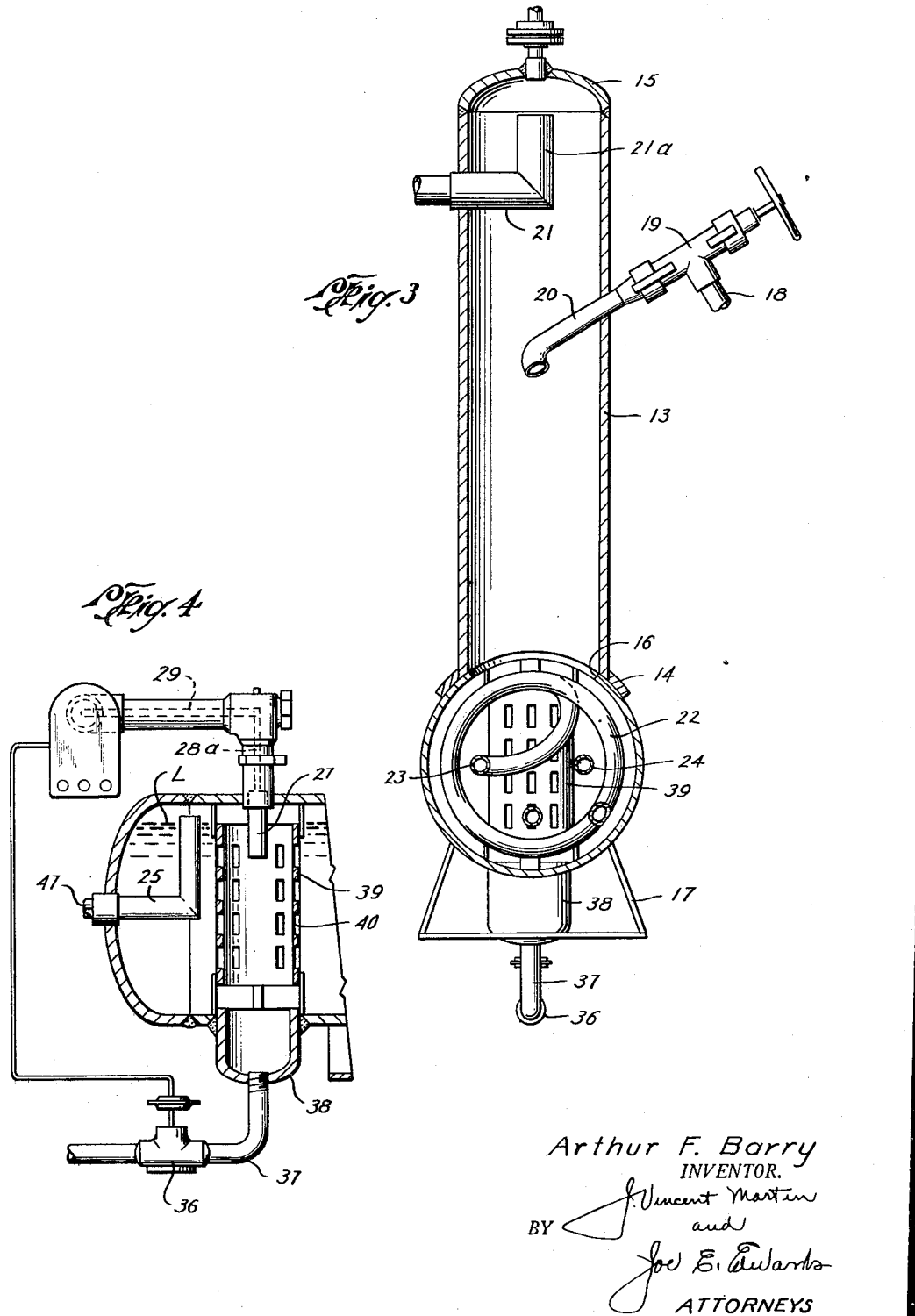

Patented Mar. 9, 1954

2,671,322

UNITED STATES PATENT OFFICE 2,671,322

SEPARATOR

Arthur F. Barry, Conroe, Tex.

Application October 16, 1950, Serial No. 190,325

4 Claims. (Cl. 62—122)

This invention relates to new and useful improvements in separators and relates particularly to separators for use in separating hydrocarbon liquids and water from high pressure gas streams.

The particular separator disclosed herein is adapted for use in the method and apparatus disclosed in my co-pending application, Serial No. 150,690, filed March 20, 1950, which has matured into Patent No. 2,528,028, dated October 31, 1950.

As is pointed out in said co-pending application, high pressure distillate wells produce a flow stream wherein the "distillate" or "condensate" or hydrocarbon liquids and water are present in a vapor phase in the stream under the high well pressures and temperatures but as the gas stream flows upwardly to the surface, a pressure and temperature drop is effected with the result that condensation takes place and the hydrocarbon components and free water occur in the liquid phase in the flow line. The temperature reduction effect in a typical high pressure gas or distillate well is greater than that of the pressure drop with the result that as the pressure and temperature are reduced condensation of water and liquids occurs. Further pressure reduction causes additional cooling, and this cooling effect may be sufficient to cause formation of gas-water hydrates or frozen particles which tend to accumulate in the line, valves, separator and other devices to interfere with efficient flow and subsequent separation of the constituents of the well stream. It has been recognized that water must usually exist in a liquid state in order for gas hydrates to form and thus, if the gas stream is maintained above dew point conditions with no liquid water in the stream no hydrates can form.

There are devices available for removing free liquids from the gas stream at the high well pressure but even though the free water is removed, the high pressure well stream remains saturated with water and contains hydrocarbons in the vapor phase; therefore, upon a subsequent pressure reduction from the high well pressure to the separating pressure, which is usually in the range of "retrograde condensation," further freezing troubles are encountered.

Increased distillate or condensate recovery as well as removal of increasing amounts of water can be had if the separator which separates the gas from the liquids can be operated at extremely low temperatures because as explained, condensation of liquefiable fractions and liquids increases with the lowering of temperature. However, in the past the temperature at which the separation has been possible has been limited by the dew point or expected hydrate formation point at the operating pressure of the separator. To prevent freezing in the separator when the flow stream is dropped from the relatively high well head pressure in the order of 3,000 to 4,000 pounds, to the separator pressure in the order of 1,000 to 1,200 pounds, it has been the practice to heat the flow stream in advance of the point of pressure reduction so that after the pressure drop the temperature is retained above the hydrate formation point at the separator pressure. This practice, however, limits hydrocarbon recovery because obviously, the separator temperature is held above the point of maximum recovery. Other attempts have been made to place heating coils in the lower portion of the separator vessel to apply the heat to the interior of the vessel to prevent freezing but these attempts have failed to recognize that by heating the entire vessel, heat is applied to the gas as well as to the liquids with the result that the gas is warmed to again pick up liquids, with the result that the ultimate aim of increasing distillate or condensate recovery and removing water from the gas stream is not accomplished.

It is, therefore, one object of this invention to provide a separator which may be continuously operated at extremely low temperatures well below the hydrate formation point at the separator pressure without danger of freezing, whereby the maximum amount of both water and hydrocarbon components may be separated from the flow stream.

An important object is to provide an improved separator having a cold zone into which the flow stream is directed subsequent to pressure reduction and also having a warm zone spaced below the cold zone whereby condensed liquids and hydrates may precipitate into said warm zone from the cold zone, together with heating means in the warm zone so arranged as to melt the hydrates precipitating thereinto without applying any appreciable heat to the cold zone whereby the separated gas in conducted from the cold zone without any substantial heating thereof.

Still another object is to provide an improved separator wherein the separated liquids are contained in a horizontally disposed chamber having a liquid level control means therein whereby a predetermined body of warm liquid is maintained in said chamber to assure melting of any hydrates which precipitate downwardly into said liquid.

A further object is to provide a separator of the character described wherein the cold zone is formed by a vertical tower and the warm zone is formed by a horizontally disposed chamber, whereby the heat applied to the warm zone will not materially affect the temperature of the cold zone and also whereby separation of the zones can be maintained without the necessity of increasing the vertical height of the separator beyond practical limits.

A particular object is to provide a separator, of the character described, wherein the separator vessel is arranged so that the liquid level control device in the warm zone is disposed out of the path of the precipitating condensed liquids and hydrates to assure continuous efficient operation of the separator.

Other objects will appear hereinafter.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is an isometric view of a separator, constructed in accordance with the invention, Figure 2 is an enlarged longitudinal sectional view of the same, Figure 3 is a transverse vertical sectional view, taken on the line 3—3 of Figure 2, and Figure 4 is a partial sectional detail of one end of the warm zone chamber and illustrating a slight modification of the invention.

In the drawings, the letter A designates the improved separator which includes a horizontally disposed vessel 10 which is preferably circular in cross-section and which has its ends closed by the usual end members 11 and 12 (Figure 2). A vertically extending tower 13, also cylindrical in cross-section, but preferably of a smaller diameter than the diameter of the vessel, extends upwardly from one end of the vessel and has a base flange 14 which is welded or otherwise secured to the exterior of the vessel. The upper end of the tower 13 is closed by a dome or cap 15 while the lower end of the vessel communicates with the interior of the vessel through an opening 16 formed in the wall of said vessel. The vessel is mounted on suitable supports 17 which are welded or otherwise secured to the lower portion of the vessel and extend transversely thereof.

The separator is adapted to receive a high pressure gas stream which under its pressure and temperature is saturated with water and hydrocarbon components in the vapor phase and which also may contain hydrocarbons in the liquid phase. Such a stream may be one which has been conducted from a high pressure gas distillate well from which free liquid water has been removed. The stream which will hereinafter be referred to as a gas stream is conducted to the separator through an inlet pipe or conductor 18, which conductor has connection with a choke device 19. The device 19 may be an ordinary adjustable choke, and after passing through the choke orifice (not shown) within the device 19, the stream is directed to a short inlet pipe 20 into the interior of the upper portion of the tower 13. It is preferable that the iinner end of the pipe 20 which is disposed within the interior of the tower be directed downwardly and also bent at somewhat of an angle with repect to the axis of the tower, whereby the incoming stream is directed downwardly in somewhat of a swirling or generally tangential path within the tower, as is clearly shown in Figure 2.

The choke device 19 is provided for the purpose of reducing the pressure of the gas stream to a point which will cause cooling of the stream below the normal hydrate formation point. The gas stream flowing through the conductor 18 is usually under relatively high pressures in the order of 3,000 to 4,000 pounds and in passing through the choke device 19, the pressure is reduced downwardly to a pressure in the order of 1,000 pounds. This pressure reduction results in cooling the stream to a point below that at which hydrates will form so that as the stream is introduced into the tower, the low temperature creates a cold zone within the interior of the tower. The hydrates which are formed in the stream by the extreme cooling action, as well as the hydrocarbon components which are liquefied as a result of said cooling, precipitate downwardly within the cold zone and ultimately precipitate into the interior of the horizontally disposed vessel 10. The cold gas from which the hydrates and condensed liquids precipitate then flows upwardly within the cold zone of the tower 13 and escapes therefrom through an outlet pipe 21; as illustrated in Figure 2, the outlet pipe has a vertical leg 21a having an open upper end so that the gas passes upwardly above the leg 21a and then downwardly and outwardly through pipe 21.

It is important to the present invention that the pressure reduction effected by the device 19 be sufficient to lower the temperature of the stream well below the hydrate formation point, and thus, the water within the stream is condensed and hydrates are formed. The extreme cooling so effected results in the condensation of certain of the hydrocarbon components and thus, additional separation of such hydrocarbon components is effected.

The hydrates and liquefied hydrocarbon components are permitted to precipitate downwardly into the vessel 10 and within this vessel a liquid body is maintained. This body of liquid, the level of which is controlled by a suitable float B, is maintained at a relatively warm temperature by means of a heating coil 22. As is clearly shown in Figures 2 and 3, the heating coil 22 has an inlet 23 and an outlet 24 which extend through the end wall 12 of the vessel. A suitable warming fluid may be circulated through the coil 22 in order to warm the body of liquid maintained in the vessel 10. It is noted that the heat applied to the body of liquid is only sufficient to warm this body to a temperature just above the melting point of the hydrates which precipitate downwardly into the liquid from the tower 13. In this way there is substantially no heat transferred into the cold zone, which is formed within the interior of the tower 13 and thus the gas which is separated in said cold zone is not heated in its passage through said zone. With this arrangement the gas escaping through the outlet 21 is of substantially the same temperature as the gas entering the inlet pipe 20 and by preventing any heating of the gas there is no danger of said gas picking up any of the liquids which have been condensed by the pressure reduction and cooling steps. Although any source of heating fluid may be provided for the coil 22 it has been found that the flow stream may be circulated through the coil 22 prior to its passage to the inlet conductor 18 for at this time the high pressure gas stream as it flows from a well will be at a relatively warm temperature. By circulating the flow stream through the coil.

the necessity for providing auxiliary heat for said coil is eliminated which simplifies the construction and results in an economic saving.

It is desirable that the liquid level of the body of liquid within the vessel be just above the coil 22 so that said coil is immersed within the body of liquid and as indicated in Figure 2 the level is maintained at that indicated by the letter L. This level is controlled by an angular outlet pipe 25 which is disposed at that end of the vessel remote from the tower 13. The outlet pipe 25 has the vertical leg 25a and as the liquid level reaches the upper end of said vertical leg, an overflow occurs which permits the liquid to flow to an outlet conductor 26. The float B in Figure 2 is provided for the purpose of discharging the water separately from the hydrocarbon liquids within the vessel 10. Although this float may be of any desired construction the float is illustrated as one which actuates a torque tube such as shown in the application of Asbury S. Parks, Serial No. 105,203, filed July 16, 1949. As illustrated the float structure comprises a solid float member 27 suspended from a rod 28 which has its upper end connected to a suspending arm 29 (Figure 1). The arm 29 has its opposite end connected with a torque tube 30 which operates a pilot control mechanism 31. The upper portion of the rod 28, the arm 29 and the torque tube are housed in suitable piping 32 which piping is, of course, welded at 33 to the vessel 10. The pilot control mechanism 31 controls the application of pilot pressure from a pilot line 34 through a line 35 which extends to a motor valve 36. The motor valve is mounted within a water outlet pipe 37 which extends from a sump 38 provided in the bottom of the vessel 10.

To provide a quiescent zone in which the float may operate the rod 28 and float 27 are preferably surrounded by a sleeve 39 having slots or perforations 40 therein. The sleeve has its ends terminating short of the tank wall and is mounted in position by suitable straps 41.

It is evident that the float 27 will control the level of the water which, of course, settles to the bottom of the vessel 10 and thus a predetermined water level will be maintained at all times within the vessel. Rising of the water level will cause the float 27 to actuate the pilot control mechanism 31 and thereby open valve 36 and permit discharge of water until the level falls to the desired point, at which time the valve 36 is closed. The level L of the hydrocarbon liquid is maintained by means of the vertical leg 25a of the angular outlet pipe 25.

A suitable relief valve 42 is mounted in the upper end of the vessel 10 and has a suitable stand pipe 43 extending upwardly therefrom. A safety head 44 having an upwardly extending stand pipe 45 is also connected in the upper end of the tank. A similar safety head 46 is mounted in the dome or upper cap 15 of the tower 13.

In the operation of the unit, the gas stream which may be a stream flowing under high pressure from a gas distillate well and from which free water has been removed is directed through the conductor 18 into the cold zone created within the interior of the tower 13 through the inlet pipe 20. In passing through the choke device 19 the pressure is reduced to the point where the cooling of the stream due to the pressure reduction is to a point below that at which hydrates form. The extreme cooling occasioned by the temperature drop results in a condensation of hydrocarbon components and also results in a condensation and freezing of the water particles to form hydrates. The heavier condensed hydrocarbon components and the heavier hydrates precipitate downwardly through the tower 13 and fall into the body of liquid which is maintained within the vessel 13. The gas which is separated from the liquids under the extremely low temperature in the tower 13 passes upwardly in the tower and escapes through the outlet pipe 31. The precipitating hydrocarbons and hydrates fall into the body of liquid within the vessel 10 which is maintained at a temperature above the hydrate point so that the hydrates will thereby be melted and liquefied so as to reduce them to water. The water will, of course, settle within the lower portion of the vessel 10 and will be intermittently discharged in accordance with the operation of the discharge valve 36 in response to the float device B. The level L of the hydrocarbon liquids within the vessel 10 is maintained by the riser pipe 25a and said liquids are discharged from the vessel through the outlet line 26.

It is pointed out that the level L at which the body of liquid within the vessel 10 is maintained is slightly below the upper portion of the tank with the result that a slight space between said level and the upper wall of the tank is maintained. There is a minimum of area of communication between the tower 13 and the vessel which means that the heat applied to the body of liquid is not transferred into the cold zone formed within the interior of the tower, and with this arrangement the gas may leave the tower without any material change in its temperature. Since the gas is extremely cold as it leaves the tower 13 it is actually under-saturated with water vapor and therefore as it moves from the tower and into the usual transporting lines, its temperature will increase to further increase its liquid carrying capacity. Because the gas will never again reach the low temperature which it had within the tower 13, there is no subsequent danger of freezing in the lines beyond the tower 13 because in order for any liquid to be released from the gas it would be necessary to drop the temperature of this gas below that of the cold zone in the tower.

It is well known that hydrocarbon recovery is increased at lower temperatures and the present separator makes it possible to recover the maximum amount of hydrocarbon components from the gas stream. The separator also removes a maximum amount of water from the gas and actually produces a gas which is under-saturated at the pressure and temperature of the separator. The improved results are obtained by maintaining the warm zone within the vessel and the cold zone within the tower so that substantially no heat is applied to the gas after separation; the heat applied to the warm body of liquid within the vessel 10 is above the hydrate point but is also sufficient to assure melting of the hydrates. It is, therefore, possible to obtain maximum hydrocarbon recovery while substantially dehydrating the gas to the point where it may meet pipe line specifications with respect to water content.

In certain instances it may not be desirable to dump the water separately from the hydrocarbon liquids and in such case the vessel 10 is modified as shown in Figure 4. In this event the angular outlet pipe 25 has its outer end plugged by a suitable plug 47, such plug being substituted for the outlet conductor 26. The float 27 is connected by means of a rod 28a with the supporting arm 29 and this locates the float at the upper portion of the vessel so that said float controls the liquid level L in the same manner that the overflow leg 25a controls such level in the first form. The float 27 in the form shown in Figure 4 will control the discharge valve 36 and all liquids will be removed from the vessel through the line 37. It is pointed out that although the sump 38 is desirable, particularly in the form where the interface between the water and the hydrocarbon liquids is to be maintained, this sump is not essential and may be omitted; the outlet pipe 37 would in such instance be connected directly in the bottom of the vessel 10.

From the foregoing, it will be evident that an improved separator for effecting the separation of liquids from high pressure gas streams is provided. The stream is directed into a cold zone following pressure reduction and said cold zone is maintained at a point below the normal hydrate formation point at the separator pressure. This extreme cooling of the gas stream increases the recovery of hydrocarbons and at the same time forms hydrates which are precipitated from the cold zone into a warm zone which might be said to be remote from the cold zone. In the warm zone a warm body of liquid maintained at a temperature above the hydration point is provided, and this liquefies the hydrates and permits the removal thereof as water. The construction is such that there is a minimum heat transfer between the warm zone and the cold zone with the result that the gas stream after being cooled is never reheated but leaves the cold zone at substantially the same temperature as said zone. It is this particular arrangement which assures substantial removal of the water from the gas.

The heating coil which extends throughout the major portion of the vessel is preferably immersed within the body of liquid and may be provided with an auxiliary heating medium; however, if desired the relatively warm high pressure gas stream may be circulated through the coil to provide the required heat for the body of liquid prior to its passage to the inlet conductor 18. It is noted that the float mechanism is preferably located at that end of the vessel 10 which is remote from the tower 13, and this assures that the precipitating hydrates and hydrocarbon components do not contact the float and therefore can never interfere with float operation. By constructing the separator with the vessel 10 extending horizontally and the tower 13 extending vertically, the overall height of the vessel is minimized. It is obvious that if the vessel 10 is vertically disposed below and as a continuation of the tower 13, the complete separator would have to have considerable height because it is necessary that the warm zone be sufficiently removed from the cold zone to prevent any substantial heating of the separated gas. It is also evident that if the vertical type vessel were provided the float mechanism would be disposed in the path of the precipitating hydrates and liquids and there might be a possibility of interfering with accurate liquid level control.

The foregoing disclosure and description of the invention is illustrative and explanatory thereof and various changes in the size, shape and materials, as well as in the details of the illustrated construction may be made, within the scope of the appended claims, without departing from the spirit of the invention.

Having described the invention, I claim:

1. A separator including, a horizontally disposed vessel, a vertically disposed tower extending upwardly from the vessel and having its lower end communicating with the interior of the vessel, an inlet conductor connected in the upper portion of the tower for conducting a gas stream into the tower, means in the conductor in advance of the point of entry of the gas stream into the tower for cooling the stream to condense liquids and form hydrates which precipitate downwardly through the tower into the horizontally disposed vessel, a tubular element having openings in its wall mounted within the vessel at a point out of alignment with the vertical tower and forming a quiescent float chamber, a float element movable within the float chamber and responsive to the liquid level in said chamber, a controller assembly actuated by the float for maintaining a predetermined liquid level in said vessel, heating means in the horizontal vessel for heating the body of liquid therein, a gas outlet extending from the upper portion of the tower, and a liquid outlet extending from the lower portion of the vessel.

2. A separator as set forth in claim 1, wherein the heating means comprises a coil within the vessel having its axis substantially aligned with the axis of the vessel and of a diameter slightly less than the diameter of the vessel, said coil extending longitudinally throughout the major portion of the vessel.

3. A separator as set forth in claim 1, wherein the float maintains a predetermined level of one liquid within the vessel, and an overflow pipe within the vessel also out of alignment with the tower for maintaining the level of a second liquid within the vessel.

4. A separator including, a vessel having an inlet conductor connected in its upper portion for conducting a gas stream into the vessel, means in the conductor in advance of the point of entry of the gas stream into the vessel for cooling the stream to condense liquids and form hydrates which precipitate downwardly through the vessel, a tubular element having openings in its wall mounted within the vessel at a point out of vertical alignment with the point at which the gas stream enters the vessel, said tubular element forming a quiescent float chamber, a float element movable within the float chamber and responsive to the liquid level within said chamber, a controller assembly actuated by the float for maintaining a predetermined liquid level in said vessel, heating means in the vessel for heating the body of liquid therein, a gas outlet extending from the upper portion of the vessel, and a liquid outlet extending from the lower portion of the vessel.

ARTHUR F. BARRY.

References Cited in the file of this patent

UNITED STATES PATENTS

| Number | Name | Date |
|---|---|---|
| 671,810 | Thurstensen | Apr. 9, 1901 |
| 1,946,195 | Daudt | Feb. 6, 1934 |
| 2,151,248 | Vaughan | Mar. 21, 1939 |
| 2,212,143 | Bays | Aug. 20, 1940 |
| 2,242,173 | Buckley | May 13, 1941 |
| 2,245,028 | Farris | June 10, 1941 |
| 2,306,553 | Miller | Dec. 29, 1942 |
| 2,528,028 | Barry | Oct. 31, 1950 |
| 2,551,399 | Silverberg | May 1, 1951 |
| 2,553,469 | Pellettere | May 15, 1951 |